United States Patent [19]

Thies et al.

[11] Patent Number: 5,651,905
[45] Date of Patent: Jul. 29, 1997

[54] HEATING DEVICE FOR A SMALL APPLIANCE

[75] Inventors: Donald E. Thies, Slinger, Wis.; Stephen A. Bender, Brentwood, Tenn.

[73] Assignee: The West Bend Company, West Bend, Wis.

[21] Appl. No.: 735,190

[22] Filed: Oct. 25, 1996

Related U.S. Application Data

[63] Continuation of Ser. No. 475,457, Jun. 7, 1995, abandoned.

[51] Int. Cl.$^6$ .................... H05B 3/06; A47J 3/44
[52] U.S. Cl. .................... 219/438; 219/439; 219/537; 219/546; 99/313
[58] Field of Search .................... 219/436, 438, 219/457, 462, 463, 537, 546, 458; 99/370, 313; 392/442, 447

[56] References Cited

U.S. PATENT DOCUMENTS

| | | | |
|---|---|---|---|
| 1,617,489 | 2/1927 | Lightfoot | 219/521 |
| 1,705,702 | 3/1929 | Backer | 219/463 |
| 1,719,498 | 7/1929 | Bernard | 99/281 |
| 1,731,882 | 10/1929 | Backer | 219/436 |
| 1,913,298 | 6/1933 | Wiegand | 219/436 |
| 2,093,939 | 9/1937 | Strack | 219/462 |
| 2,213,723 | 9/1940 | Smith | 219/438 |
| 2,719,212 | 9/1955 | Kirscher | 219/41 |
| 2,785,276 | 3/1957 | Punzak | 219/436 |
| 2,817,743 | 12/1957 | Foster | 219/436 |
| 2,864,929 | 12/1958 | Schwing | 219/19 |
| 2,916,599 | 12/1959 | Stiles | 219/44 |
| 3,333,087 | 7/1967 | Manship et al. | 99/310 |
| 3,392,662 | 7/1968 | Schwartz, Jr. | 99/285 |
| 3,430,032 | 2/1969 | Morey | 219/433 |
| 3,682,089 | 8/1972 | Unger et al. | 99/310 |
| 3,701,883 | 10/1972 | Tilp | 219/436 |
| 3,721,176 | 3/1973 | Logan | 99/310 |
| 3,725,642 | 4/1973 | Weidner | 392/447 |
| 3,748,999 | 7/1973 | Beverett | 99/313 |
| 3,760,156 | 9/1973 | Kehl et al. | 219/436 |
| 3,836,713 | 9/1974 | Halvorson, Sr. | 219/441 |
| 4,147,925 | 4/1979 | Belinkoff | 219/530 |
| 4,209,686 | 6/1980 | Moglia et al. | 219/375 |
| 4,241,288 | 12/1980 | Aoshima et al. | 219/438 |
| 4,309,940 | 1/1982 | Lowerre, Jr. | 99/281 |
| 4,327,280 | 4/1982 | McWilliams | 219/464 |
| 4,504,731 | 3/1985 | Fischer | 219/457 |
| 4,543,473 | 9/1985 | Wells et al. | 219/523 |
| 4,650,969 | 3/1987 | Kicherer et al. | 219/457 |
| 4,996,410 | 2/1991 | Ho | 219/438 |
| 5,023,927 | 6/1991 | Bardell | 392/442 |
| 5,352,862 | 10/1994 | Barr | 219/205 |
| 5,367,607 | 11/1994 | Hufnagel et al. | 392/465 |

FOREIGN PATENT DOCUMENTS

| | | |
|---|---|---|
| 0293395 | 7/1929 | United Kingdom . |
| 0335160 | 9/1930 | United Kingdom . |
| 08539849 | 11/1960 | United Kingdom . |

*Primary Examiner*—Mark H. Paschall
*Assistant Examiner*—J. Pelham
*Attorney, Agent, or Firm*—Jansson & Shupe, Ltd.

[57] ABSTRACT

Disclosed is a new heating device for an appliance such as a coffee urn. Such device has a main heating element and a spaced-apart warming element, both of which are embedded in a common casting. The device may be mounted to and removed from an appliance as a single unit and when mounted, the main heating element is closer to the liquid container than the warming element. The elements are vertically spaced from one another and each element has flattened coil portions contacting one another. Such flattened portions minimizes the height of the device. The new device also has one or more "mounting points" for attaching auxiliary components such as a grounding wire and a thermostat, as needed.

11 Claims, 5 Drawing Sheets

HEATING DEVICE FOR A SMALL APPLIANCE

This application is a continuation of application Ser. No. 08/475,457, filed Jun. 7, 1995, now abandoned.

FIELD OF THE INVENTION

This invention relates generally to electric heating and, more particularly, to heating devices powered by electricity.

BACKGROUND OF THE INVENTION

Electrically-powered devices and apparatus are widely used, at least because of their convenience and ease of operation. One need only browse through a commercial restaurant equipment store or the small appliance section of a modern department store to find numerous examples of electrically-powered products for residential and commercial use.

Some of these appliances have electric motors; others use electric heating devices for cooking food, brewing beverages and the like. An example of an appliance of the latter type is an electric urn for making brewed beverages, e.g., coffee, tea, hot spiced drinks or the like. Such urns are available in a variety of sizes with 55 and 100 cup coffee urns being very common.

"Brewing-type" electric appliances usually use two heating elements, namely, a higher-power element for brewing or "perking" the beverage and a lower-power element for post-brewing warming. The latter element keeps the beverage hot for an extended period of time during serving. Examples of prior art appliances having two heating elements are shown in the patent literature. Examples include U.S. Pat. Nos. 3,392,662 (Schwartz, Jr.), 3,836,713 (Halvorson, Sr.) and 4,147,925 (Belinkoff).

The Schwartz, Jr. patent shows a coffee percolator, the primary or brewing coil for which is embedded in a casting. The secondary coil (for post-brewing warming) appears to be wrapped around a necked-down portion of the casting. Such construction suggests a secondary operation, namely, wrapping the secondary coil, is required to make the assembly. The arrangement of the heating assembly is consistent with known technology in that the secondary warming coil is closer to the bottom of the vessel than is the primary coil.

The Halvorson, Sr. patent shows a heater assembly for a coffee percolator. Such assembly uses a "rope-like" warming coil covered with a soft, woven fabric covering. The flexible warming coil is wrapped around a rigid, cylindrical main heater body member. Such body member has a number of recesses for receiving the warming coil and the result is said to be a unitized subassembly. It is apparent from the Halvorson, Sr. patent that ease of assembly and disassembly are important considerations when designing a small appliance.

The Belinkoff patent shows a heater assembly for use with a percolator. The main brewing coil is spiral-wrapped around a well formed in the bottom of the liquid container and the warming coil (or "auxiliary" coil, as the patent calls it) is attached to and in intimate contact with a heat distribution plate at the bottom of the container. The main and auxiliary coils are in series and both coils are used for post-brewing warming. A distinct disadvantage of such heater assembly is that the required time to assemble it to the percolator is relatively long and, in view of the invention, is unnecessary.

A feature common to the apparatus shown in the Schwartz, Jr., Halvorson, Sr. and Belinkoff patents is that all of them mount the warming coil closer to the bottom of the liquid container than the main heating coil. The apparent reason for this arrangement is that since the warming coil produces substantially less heat than the main heating coil, it is thought to be necessary to mount such warming coil relatively close to the container bottom.

While the prior art heating devices have been generally satisfactory for their intended purpose, some are attended by certain disadvantages. For example, the fabric-covered warming coil like that shown in the Halvorson, Sr. patent is thought by some to be undesirable because once wet, it stays wet for some extended period.

Another disadvantage relates to relative ease of assembly. In one prior art coffee urn, the main heater unit and rope-like warming heater are separately handled during manufacture and separately mounted. The latter is attached to the urn by several clips, each of which has to be separately affixed by a screw or the like. The assembly time required to mount such warming heater is undesirably long.

Yet another disadvantage of prior art devices is that they do not address the matter of mounting auxiliary components such as thermostats. The percolator assembly of the Belinkoff patent requires a separate mounting bracket for the percolator thermostat. And as will become apparent from the descriptions of the invention, the heating device of the Belinkoff patent is unnecessarily high and increases the height of the percolator assembly with which it is used.

An improved heating device which is free of water-absorbing material, which is quick to mount and easy to wire, which has excellent heat-transfer characteristics and which readily accommodates an auxiliary device such as a thermostat and which addresses other disadvantages of prior art devices would be an important advance.

OBJECTS OF THE INVENTION

It is an object of the invention to provide a new heating device overcoming some of the problems and shortcomings of the prior art.

Another object of the invention is to provide a new heating device which is free of water-absorbing material.

Another object of the invention is to provide a new heating device which is quick to mount and easy to wire to other electrical circuit components.

Yet another object of the invention is to provide a new heating device which has excellent heat-transfer characteristics.

Another object of the invention is to provide a new heating device having reduced height.

Another object of the invention is to provide a new heating device for an appliance such as an urn for brewing hot beverages.

Still another object of the invention is to provide a new appliance which facilitates mounting of auxiliary components such as one or more thermostats. How these and other objects are accomplished will become apparent from the following descriptions and from the drawings.

SUMMARY OF THE INVENTION

The invention involves a heating device of the type used in a small appliance such as an urn for brewing coffee and other hot beverages. The device has a main heating element for brewing or "perking" the beverage and an element for keeping such beverage warm after brewing is complete.

In the improvement, the device includes a casting and the main heating element and the warming element are embedded in such casting. The device may be mounted to and removed from an appliance as a single unit. Ease of mounting and removal provides significant cost-savings during original manufacturing assembly and if the device later needs to be replaced. The elements are vertically spaced from one another in the casting and the casting is generally cylindrical in shape.

In a more specific aspect, the device has an upstanding threaded "neck-like" attachment portion which extends through an opening in the bottom panel of the appliance when the appliance is fully assembled. When the device is mounted and secured with respect to the appliance bottom panel, the main heating element is between the warming element and the attachment portion. To put it in other terms, the warming element is spaced from the appliance bottom panel while the main heating element is in closer proximity thereto.

In prior art arrangements, the warming element is either closer to the bottom panel than the main heating element or is in contact with such bottom panel. It has been found that the superior heat transfer characteristics of the new device permit the warming element to be spaced from such bottom panel and still keep the brewed beverage at the desired temperature.

In another aspect of the invention, the main heating element and the warming element define generally circular coils which are of substantially equal diameter. Each element has first and second coil portions which contact one another but which are spaced from the coil portions of the other element.

In a preferred embodiment, the first and second coil portions of either element each have a flattened surface and such flattened surfaces contact one another. In a highly preferred embodiment, the first and second coil portions of both elements each have a flattened surface contacting the flattened surface of another coil portion of that element. By using flattened coil portions, full heating and post-brewing warming capacity are provided while yet minimizing the height of the device.

In a specific embodiment, the heating device has one or more mounting points for attaching a device grounding wire and/or for mounting one or more thermostats. The mounting point for the grounding wire receives a fastener in electrical contact with the casting and when the device is installed in the appliance, a grounding wire is in electrical contact with the fastener and, thus, with the casting.

Other mounting points may be used to attach one or more thermostats. Where a primary and backup thermostat are used, such thermostats may be mounted on separate supports attached at separate mounting points or may be "tandem-mounted" on a single support.

Further details regarding the invention are set forth in the following detailed description and in the drawings.

DETAILED DESCRIPTIONS OF PREFERRED EMBODIMENTS

Figure 1:
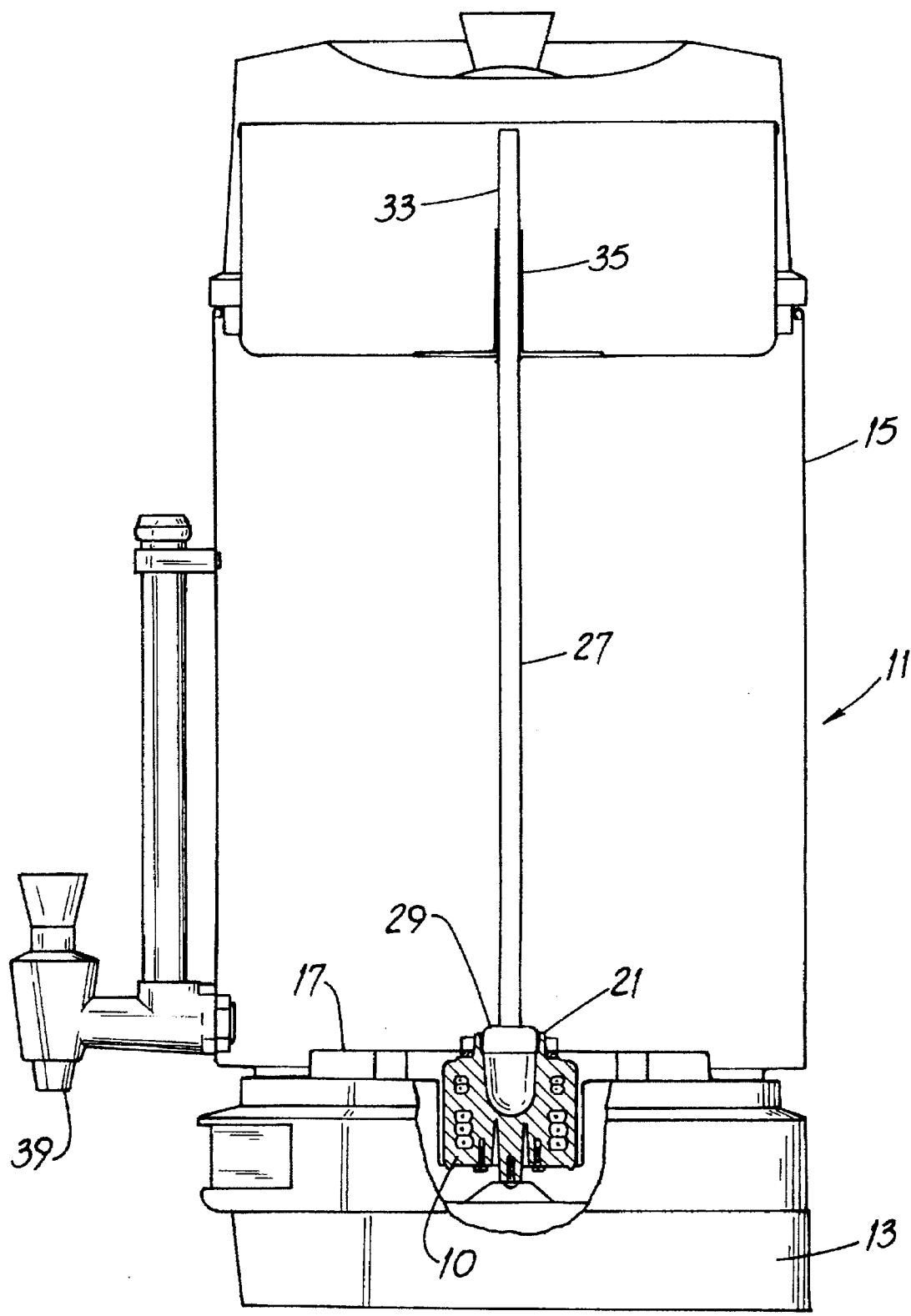
FIG. 1 is a side elevation section view showing the new heating device in conjunction with an exemplary coffee urn, a type of appliance with which such new device may be used.
Figure 2:
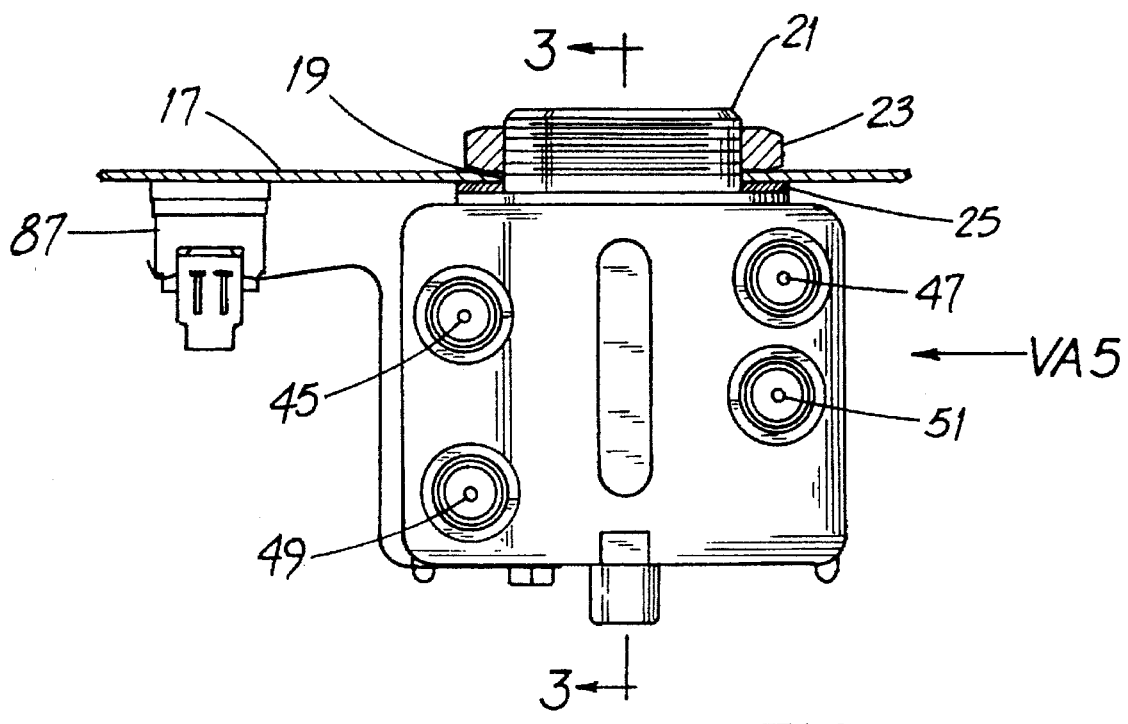
FIG. 2 is a side elevation view of the new heating device shown in conjunction with a thermostat and with a portion of the appliance bottom panel. Parts are broken away.
Figure 3:
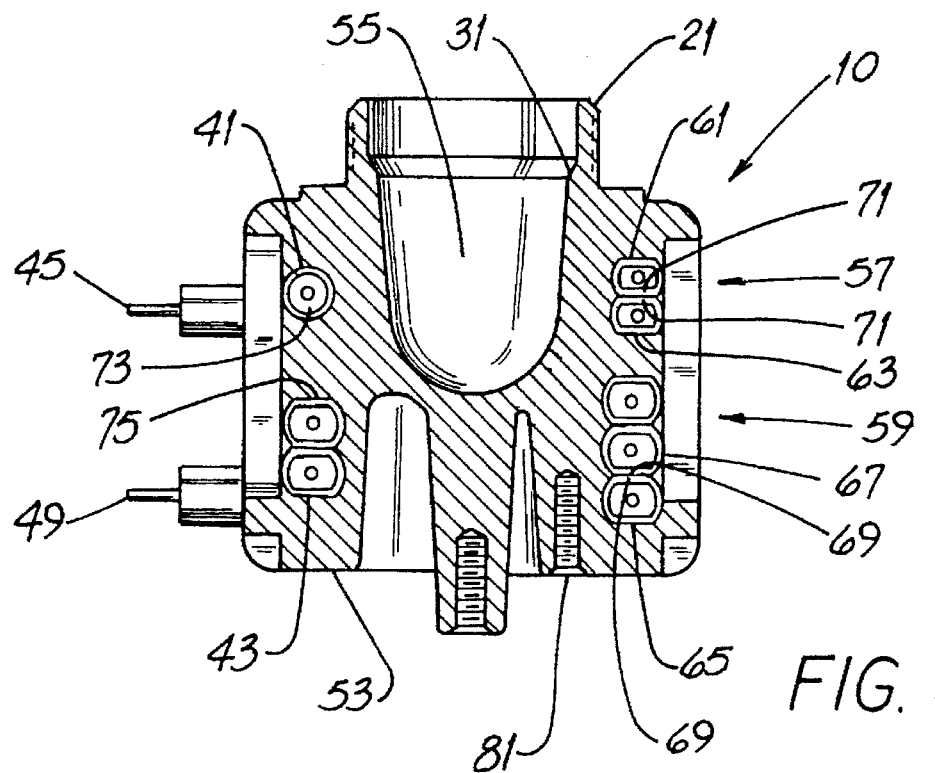
FIG. 3 is a cross-sectional view of the new heating device taken generally along the viewing plane 3—3 of FIG. 2.

Before describing details of the new heating device 10, it will be helpful to have an understanding of a way in such device 10 is used in an appliance for making a hot beverage. Referring to FIGS. 1, 2 and 3, a coffee urn 11 has a base 13 supporting a container 15 in which cold liquid, e.g., water is received for brewing. The container 15 has a bottom panel 17 with an opening 19 therethrough. The device 10 has a threaded "neck-like" attachment portion 21 which extends through the opening 19 and such portion 21 has a nut 23 tightened thereon for securing the device 10 with respect to such panel 17. A gasket 25 is interposed between the device 10 and the panel 17. Such gasket 25 is preferably made of asbestos-free fiber material or laminated graphite-and-steel. (When the gasket 25 is of laminated graphite-and-steel, it may be possible to eliminate the grounding wire 85 mentioned below.)

A stem assembly 27 has its lower "canopy" 29 in contact with an annular support surface 31 in the device 10. The assembly upper end 33 extends through the tube 35 of a perforated basket 37 in which dry ground coffee is placed. A spigot 39 is attached to the side of the container 15 and when opened, liquid from the container 15 flows out the spigot 39.

Figure 6:
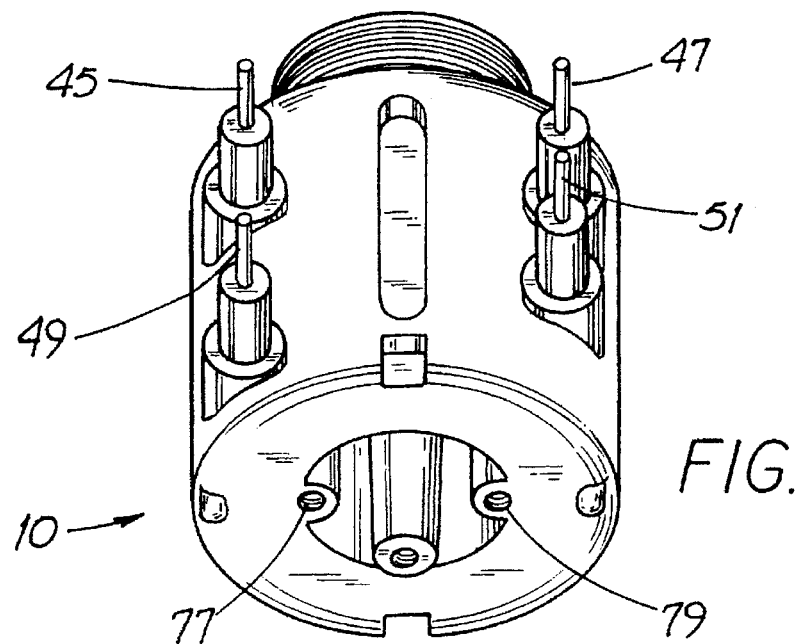
FIG. 6 is a perspective view of the new heating device.
Figure 4:
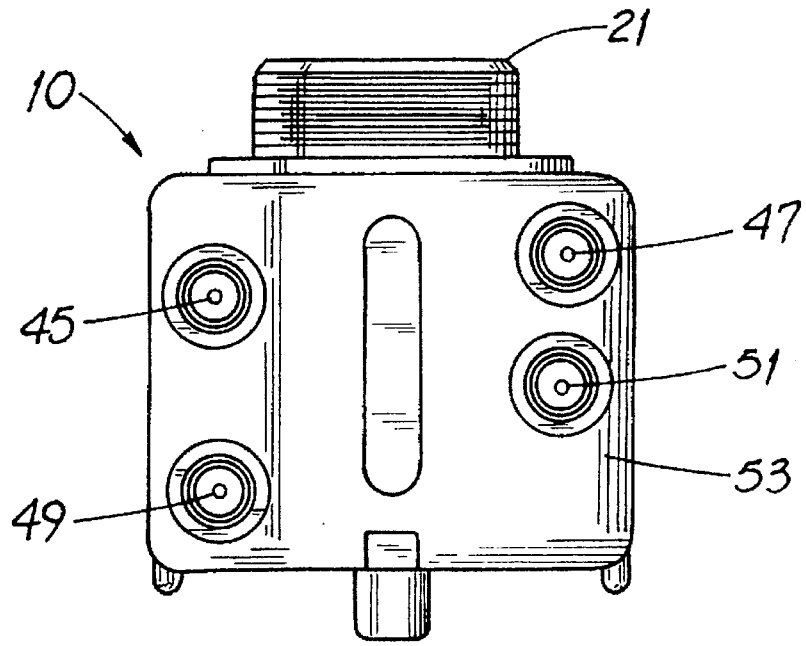
FIG. 4 is another side elevation view of the new heating device generally like the view of FIG. 2.
Figure 5:
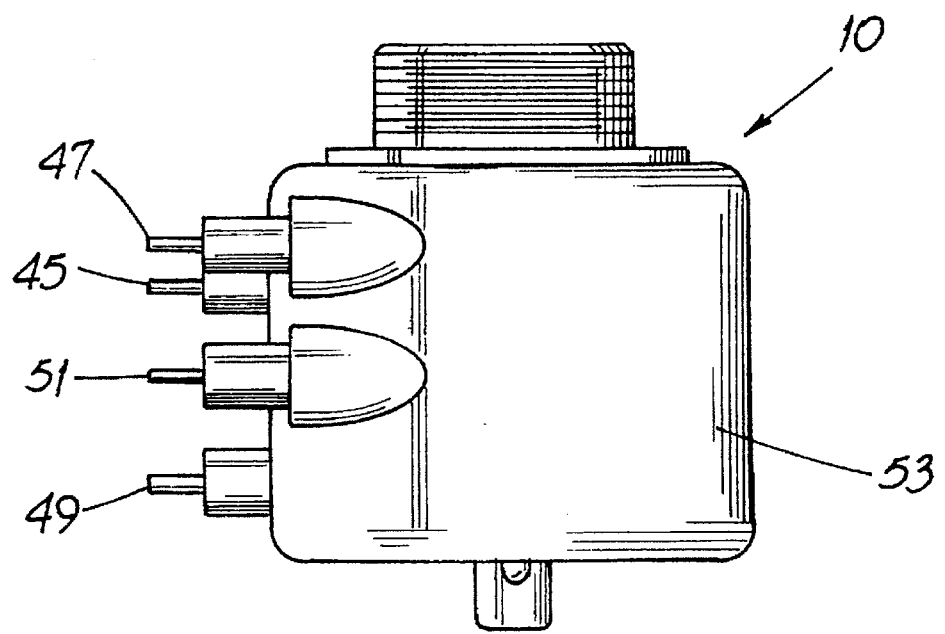
FIG. 5 is a side elevation view of the new heating device taken generally along the viewing axis VA5 of FIG. 2.
Figure 9:
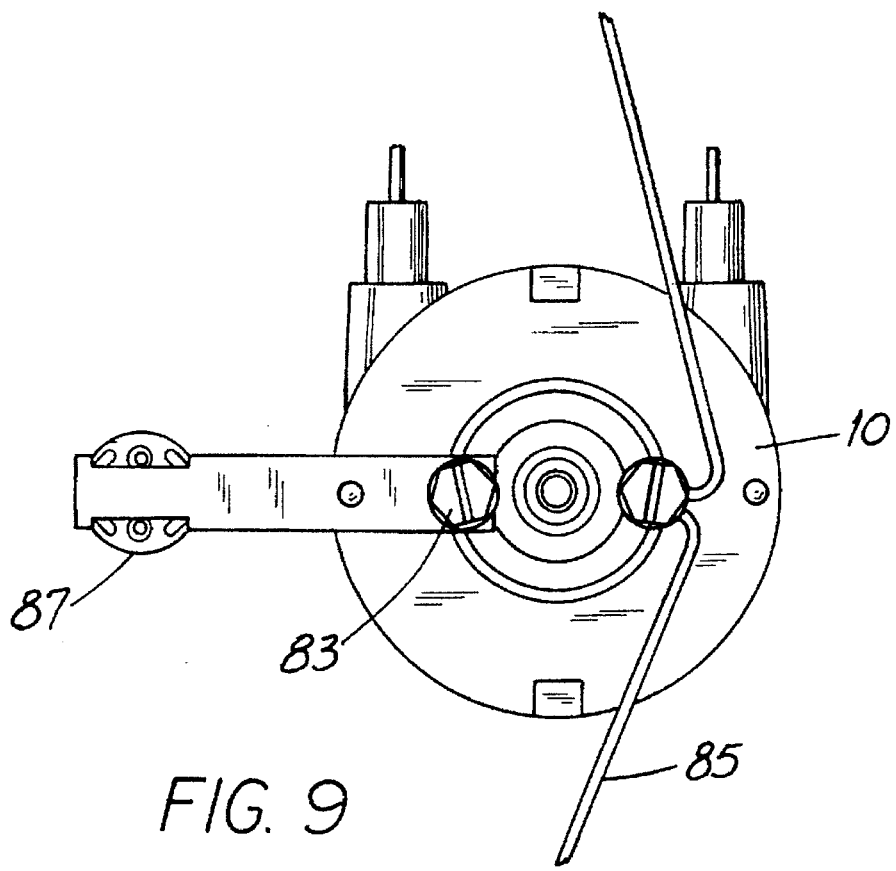
FIG. 9 is a bottom view of the new heating device taken generally along the viewing axis VA7 of FIG. 5 and showing a single mounted thermostat and a grounding wire.

Referring also to FIGS. 4, 5 and 6, the device 10 includes a coiled main heating element 41 and a coiled warming element 43 spaced vertically below the heating element 41. The terminals 45, 47 of the main element 41 and the terminals 49, 51 of the warming element 43 are brought out for external connections. Both elements 41, 43 are embedded in a generally-cylindrical casting 53. Preferably, the casting 53 is made of aluminum or other material having generally-similar heat transfer characteristics. When the main element 41 is energized, the liquid in the chamber 55 is brought to a boil and thereupon "perks" up the stem assembly 27 to wet the ground coffee in the basket 37 and express the flavor therefrom.

From an inspection of FIGS. 2 and 3, it is apparent that when the device 10 is mounted and secured with respect to the appliance bottom panel 17, the main heating element 41 is between the warming element 43 and the attachment portion 21. It is also apparent how the device 10 may be mounted to and removed from an appliance as a single unit. Ease of mounting and removal provides cost savings during original manufacturing assembly and if the device 10 later needs to be replaced.

Referring now to FIGS. 3 and 6, the main heating element 41 and the warming element 43 each define generally circular coils 57, 59, respectively, which are of substantially equal diameter. The warming element 43 has more "turns" of tubular electric heater than the main heating element 41 notwithstanding that the wattage of such warming element 43, e.g., about 170 watts, is well less than that of the main element 41. The wattage of the main element 41 is about 1500 watts at 120 V or about 1640 watts at 220–240 V.

The main element 41 has first and second coil portions 61, 63, respectively, which contact one another but which are spaced from the first and second coil portions 65, 67, respectively, of the warming element 43. In one preferred embodiment, the first and second coil portions 61, 63 of the main heating element 41 each have a flattened surface 69 and such flattened surfaces 69 contact one another. In another preferred embodiment, the first and second coil portions 65, 67 of the warming element 43 each have a flattened surface 71 which contacts a flattened surface 71 of another coil portion 65, 67 of such element 43. Using at least one or more flattened coil portions 61, 63, 65, 67 helps reduce the overall height of the device 10 by at least some small dimensional increment.

However, in a highly preferred embodiment, the first and second coil portions 61, 63 and 65, 67 of both elements 41, 43 each have a flattened surface 69 or 71 contacting the flattened surface 69 or 71 of another coil portion of that element 41 or 43. By using flattened coil portions 61, 63, 65, 67 in both the main element 41 and the warming element 43, full heating and post-brewing warming capacity are provided while yet minimizing the height of the device 10.

The main heating element 41 and the warming element 43 each have a central conductor wire that is surrounded by an insulating material 73. In turn, the insulating material 73 is surrounded by a tube-like outer metallic jacket 75, preferably cold-rolled steel or other material having similar heat-transfer capability. Circular-cross-section resistance heaters used to make the new elements 41, 43 and device 10 are often referred to as tubular electric heaters.

Referring also to FIGS. 2, 6, 7, 8 and 9, the new heating device 10 is preferably configured to address shortcomings of prior art heating units insofar as mounting of auxiliary components is concerned. In a specific embodiment, the new device 10 has one or more mounting points 77, 79, 80. Each of such mounting points 77, 79 includes a cored hole in the casting 53, each for receiving a fastener 83. One of the points may be used for attaching a device grounding wire 85 and/or for mounting one or more thermostats.

Figure 7:
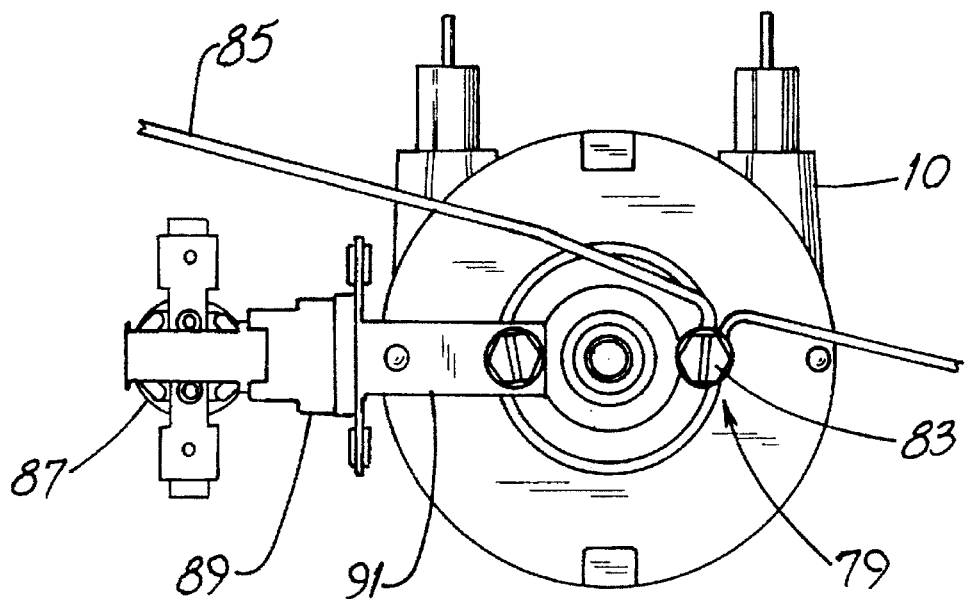
FIG. 7 is a bottom view of the new heating device taken generally along the viewing axis VA7 of FIG. 5 and showing a pair of mounted thermostats and a grounding wire.

As in FIG. 7, the mounting point 79 for the grounding wire 85 receives a fastener 83 which is in electrical contact with the casting 53 which is assumed to be made of metal. When the device 10 is installed in the appliance, a grounding wire 85 is in electrical contact with the fastener 83 and, thus, with the casting 53.

Figure 8:
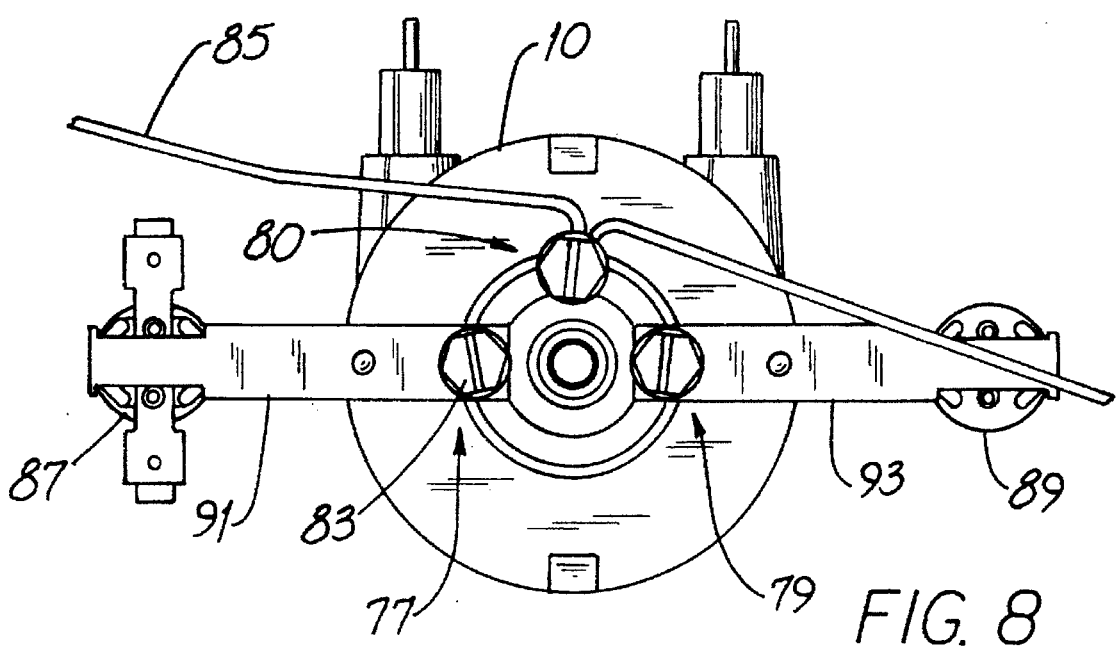
FIG. 8 is another embodiment of the new heating device taken generally along the viewing axis VA7 of FIG. 5 and showing three mounting points, one for a grounding wire and two for a pair of thermostats mounted on separate supports.

Other mounting points may be used to attach one or more thermostats. As shown in FIG. 8, where a primary and backup thermostat 87, 89, respectively, are used, such thermostats 87, 89 may be mounted on separate supports 91, 93, respectively, attached at separate mounting points 77, 79, respectively. Or as shown in FIG. 7, such thermostats 87, 89 may be "tandem-mounted" on a single support 91.

The new heating device 10 represents a remarkable improvement in efficiency, at least over the earlier arrangement used by the assignee. For example, for an urn containing 100 cups of water, the brewing time reduced from about 75–80 minutes to about 55–65 minutes even though the wattage of the respective main heating elements is about the same.

While the principles of the invention have been shown and described in connection with preferred embodiments, it is to be understood clearly that such embodiments are exemplary and not limiting.

We claim:

1. In a device for heating water to brew a beverage and having a main heating element and a post-brewing warming element, the improvement wherein:

the device includes a rigid metal casting;

the main heating element and the warming element are both embedded in the casting;

the warming element is generally cylindrical and has portions of coils vertically aligned with one another; and the main heating element has coils vertically-spaced above the coils of the warming element and vertically aligned with the coils of the warming element.

2. The device of claim 1 wherein:

the main heating element and the warming element each include generally circular coils; and the coils of the warming element are of substantially equal diameter one to another.

3. The device of claim 1 wherein the warming element has vertically-stacked first and second coil portions contacting one another.

4. The device of claim 3 wherein:

the first coil portion has a flattened upper surface;

the second coil portion has a flattened lower surface; and the flattened surfaces of the first and second coil portions contact one another.

5. The device of claim 3 wherein:

the first and second coil portions of the warming element each has a flattened surface;

the flattened surfaces of the first and second coil portions of the warming element are substantially horizontal and contact one another;

the first and second coil portions of the main heating element each has a flattened surface; and the flattened surfaces of the first and second coil portions of the main heating element are substantially horizontal and contact one another.

6. The heating device of claim 1 further including:

a bottom surface;

a mounting point at the bottom surface and receiving a fastener in electrical contact with the casting; and a grounding wire in electrical contact with the fastener.

7. The heating device of claim 6 wherein:

the mounting point is a first mounting point;

the device includes a second mounting point at the bottom surface and having a thermostat fixed with respect thereto.

8. In combination, a heating device for a beverage-brewing appliance and a container for making a brewed beverage and having a bottom panel, the combination including:

a main heating element having spiral-wrapped portions including a first flattened coil portion and a second flattened coil portion below the first flattened coil portion and contacting such first flattened coil portion; and a spiral-wrapped warming element vertically spaced from the main heating element and having first and second coil portions having flattened surfaces which are horizontal and which contact one another;

and wherein:

the heating device is attached to such bottom panel;

the main heating element is between the warming element and the bottom panel;

the main heating element and the warming element are embedded in a single casting.

9. The combination of claim 8 wherein the casting is rigid, is made of metal, has a length and is generally cylindrical along such length.

10. The device of claim 8 including a bottom surface and first and second mounting points at the bottom surface for securing a grounding wire and a thermostat, respectively.

11. The device of claim 10 wherein the bottom surface is on a metal casting and:

a fastener is attached at the first mounting point and is in electrical contact with the casting; and a grounding wire is in electrical contact with the fastener.

* * * * *